Figure 1:
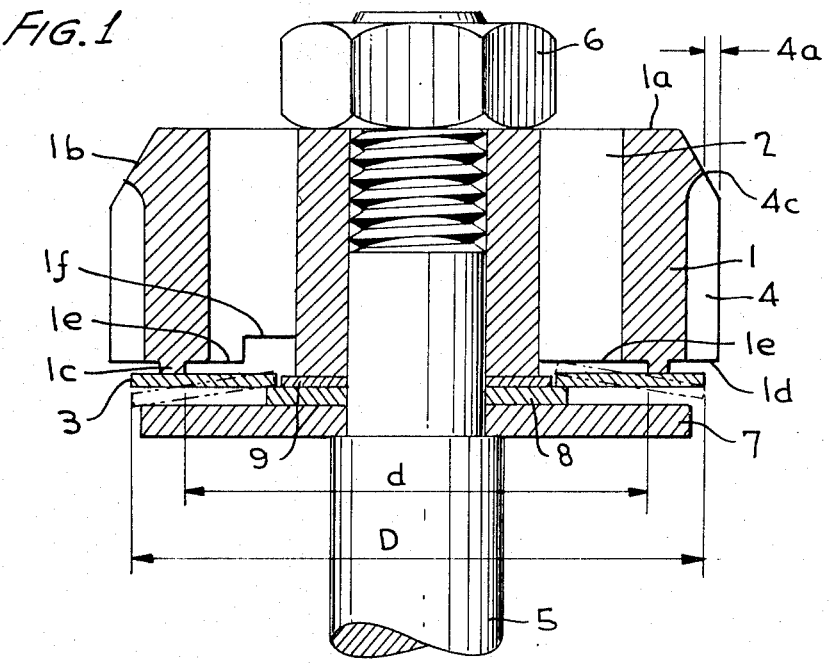

United States Patent [19]
DeCarbon

[11] 3,747,714
[45] July 24, 1973

[54] SHOCK ABSORBER PISTONS
[76] Inventor: Christian Bourcier DeCarbon, 64 Boulevard Maurice-Barry, 92-Neuilly-sur-Seine, France
[22] Filed: Oct. 26, 1970
[21] Appl. No.: 83,709

[52] U.S. Cl. .............................................. 188/317
[51] Int. Cl. ............................................ F16d 57/00
[58] Field of Search ................... 188/322, 316, 317, 188/320

[56] References Cited
UNITED STATES PATENTS
| | | | |
|---|---|---|---|
| 3,056,473 | 10/1962 | Zeidler | 188/322 X |
| 3,085,661 | 4/1963 | Takagi | 188/316 |
| 3,029,903 | 4/1962 | Wasdell | 188/322 X |
| 3,003,596 | 10/1961 | deCarbon | 188/322 X |
| 3,003,594 | 10/1961 | deCarbon | 188/322 X |
| 2,748,898 | 6/1956 | deCarbon | 188/322 X |

FOREIGN PATENTS OR APPLICATIONS
1,077,650 11/1954 France .............................. 188/316

Primary Examiner—Edward A. Sroka
Attorney—Watson, Cole, Grindle & Watson

[57] ABSTRACT

In addition to the valve controlled passageways through the shock absorber piston, there are provided a series of permanently open passageways in the form of longitudinal grooves in the periphery of the piston, these grooves having shallow attenuated portions formed either by double bevels in the bottom surfaces thereof or by the intersection of an end surface of a groove with a bevel formed around the periphery of an end surface of the piston. The controlled passageways are governed by an annular disk clack valve floatingly mounted against a circular ridge on one surface of the piston and adapted to flex under the influence of compression and rebound movements of the piston to control flow of damping fluid around both edges of the annular valve disk. The sum of the widths of the peripheral grooves should not exceed about 15 to 20 percent of the circumference of the piston; and the outside diameter D of the clack valve minus the diameter d of the ridge divided by the diameter d should be not less than 15 percent.

9 Claims, 3 Drawing Figures

SHOCK ABSORBER PISTONS

The present invention relates to an improvement in hydraulic shock absorbers.

It is known, according to French Pat. No. 995,019, how to provide a piston with permanent passages arranged on the periphery of the piston intended to achieve a running of oil in an extremely thin layer between the piston and cylinder. Said passages occupy the greater part of the circumference of said piston and are interrupted only by guide bearings. Since the layer of oil in the passages has to be extremely thin to obtain the desired result, the fabrication tolerances are necessarily very tight and the cost is high and, in addition, the effect of temperature on the operation of the shock absorber is very great.

Moreover, it is known according to French Pat. No. 1,563,215, how to use with hydraulic shock absorbers a piston working with a single clack to control the passages of the liquid through said piston during the compression and expansion movements, and to provide constantly open passages to assure a good riding comfort in the form of axial passages in a support piece placed with the piston on the same rod. The clack in the form of a washer or disk is then placed between the piston and support piece and has a certain play between its inside diameter and the outside diameter of the washer placed between said support piece and the piston. Although this embodiment is perfect from the viewpoint of riding comfort, since the permanent passages are in direct line and allow the liquid to pass without sudden deviation, it is, nevertheless, relatively burdensome because of the support piece which has to have a special design.

The present invention aims at eliminating these drawbacks while enjoying the same advantage, and it has for its object a novel arrangement of the permanent passages in the piston itself of the shock absorber, by providing axial passages on the periphery of said piston, said passages being made up of several grooves the total of whose effective widths do not exceed 15 to 20 percent of the circumference of the piston, the depth of said grooves being relatively great, except on one part of their length which is of small section to constitute an obstacle intended to cause the lamination of the liquid in passing, the length of the part with the small section being at most equal to 15 percent of the height of the piston. In many cases, this attenuated section can be defined by a sharp edge of infinitesimal vertical length.

With the permanent passages according to the invention, the following advantages are obtained:

The section of passages which determine the characteristic of the shock absorber can be obtained in a simple way with a great precision. The effect is improved still more since the passages are still more direct and the flow of the liquid takes place along the wall of the shock absorber tube which facilitates the rapid destruction of the kinetic energy of the oil jet. Further, it is possible to obtain a certain automatic compensation of the variation of the viscosity of the liquid of the shock absorber, depending on the temperature, by providing a piston whose heat expansion factor is greater than that of the shock absorber tube.

According to the particular embodiments of said permanent passages, they are obtained in the casting of the blank either by making the groove thus obtained end before the end of the piston, the passage then being opened by a turning operation to remove by beveling or cutting the required passage section; or by a profile of the grooves with a double bevel, the distance from the summit to the periphery of the piston which determines the section of the passage being defined by a stamping operation, with a suitable punch.

It should be noted that the permanent passages according to the invention can be used with pistons provided with all types of clacks such as double-action monoclacks, in the form of washers or other singe-action clacks, one of which assures the control of the shock absorbing during the course of compression, and the other assures the control during expansion.

However, if the piston provided with permanent passages according to the invention works with a single double-action clack, made up of a disk washer, it is advantageously provided that said washer rests on the piston by a circular support of about 1 mm in width, obtained by releases provided on both sides of said support, the inside release being made so that the face of this release acts as a stop for the washer when its deformation under the action of the liquid during expansion corresponds to a slope of the angle of a cone of about 10 percent.

A similar stop can also be obtained for compression by placing a retaining disk on the piston rod, a shim washer and a positioning washer for the clack being locked between the piston and the retaining disk, the diameter of said disk being able to be less than that of the clack. Under the conditions, the maximal deformation can be limited by the retaining disk which acts as a stop. This arrangement further has the advantage of permitting a certain hydraulic damping of the vibrations of the clack.

By way of example and to facilitate understanding of the following description, there are represented on the accompanying drawings:

FIG. 1, a section of a piston according to the invention with a double-action clack.

Figure 2:
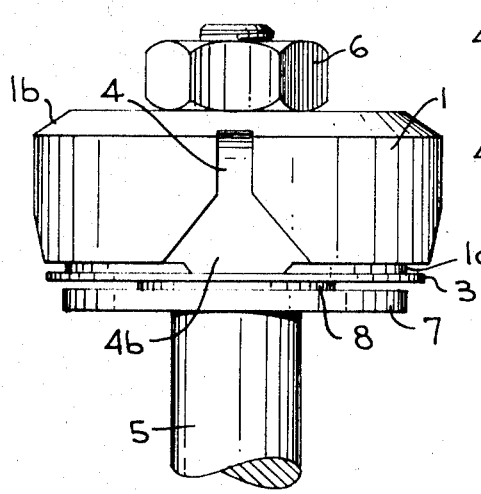

FIG. 2, an elevational view of a piston-clack-rod assembly, according to FIG. 1.

Figure 3:
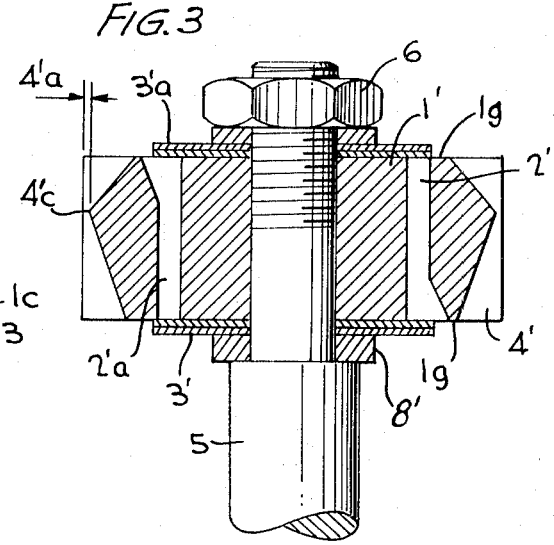

FIG. 3, section of a piston according to another embodiment with two single-action clacks.

Referring to these figures, it can be seen that piston 1 has passages 2 formed therein, said passages being more or less blocked by clack 3. Further, piston 1 comprises permanently open by-pass passages 4 arranged on its periphery. As can be seen, passages 4 are in the form of grooves provided in the blank casting, the grooves stopping before reaching end 1a of piston 1. Then to obtain the desired passage section 4a, piston 1 is put on the lathe to make a bevel or the like 1b, whose width and angle determine the size of passage 4a, the summit being made up of a sharp angle 4c.

In FIG. 2 it can be seen that a part 4b of passage 4 is widened to facilitate entry of the liquid into the passage, since clack 3 partially blocks it. However, the effective minimum width remains as at 4 in FIG. 2.

On the attenuated part of the piston rod, there is mounted a retaining disk 7, a support washer 8, a positioning washer 9 and piston 1 properly so-called, the whole locked by nut 6. In the example shown, the thickness of the positioning washer 9 is less than that of clack 3, so that this latter rests on circular support 1c with a certain prestress. It is obvious, however, that the same prestress can be obtained by giving to circular support 1c a suitable height in relation to support washer 8.

Clack 3 with outside diameter D rests therefore on circular support 1c of diameter d, and the ratio $D-d/d$ is greater than or equal to 15 percent. During compression, i.e., during a movement of piston 1 toward the side of nut 6, the pressure of the liquid presses the inside edge of clack 3 against the support washer, while the outside edge is thrust downward with a deformation of clack 3 in the form of a cone. The liquid then passes through passages 2 and the annular opening between circular support 1c and clack 3. In the left half of FIG. 1 is represented by dotted lines the position of clack 3 which has come to strike against retaining disk 7. The essential role of said disk 7 is to achieve a hydraulic damping of the movement of clack 3, since at each opening of clack 3, liquid is driven from the space between said clack 3 and retaining disk 7. This damping is particularly advantageous to eliminate the vibrations of clack 3.

During expansion, clack 3 is supplied against circular support 1c as indicated in dotted lines on the right part of FIG. 1, and the liquid passes between the inside edge of said clack and support washer 8. Deformation in the form of a cone is limited here by clearance or relief surface 1e made in the piston. On the right part of FIG. 1, is represented an embodiment where the inside edge of the clack rests on the relief surface 1e; while the left part of FIG. 1 represents a double relief surface 1e, 1f, so that clack 3 does not strike there by its inside edge, but by a part more removed from the center, which reduces the fatigue of said clack. To limit the stresses to an acceptable value, the depth of the relief at 1e has been determined so that the slope of the angle of deformation of the clack does not exceed about 10 percent.

As far as relief 1d is concerned, it is intended to reduce the length of the trickle of liquid under control of the clack.

It should be noted that retaining disk 7 can be used as a support for an elastic stop of the end of expansion.

In FIG. 3 is shown an embodiment with a piston 1 with two single action clacks 3', 3'a. Said clacks are locked on piston 1' by nut 6. Passages 2', 2'a start with widened parts respectively from the lower and upper faces 1g of the piston. During compression, the liquid passes through passage 2'a and opens clack 3' and during expansion the liquid passes through passage 2' and opens clack 3'a.

Permanent passages 4' are obtained here by a double bevel profile, the passage section 4'a being defined by the distance from the summit 4'c to the wall of the shock absorber tube. To obtain this passage section with a great precision, the summit is cut back a certain distance with a suitable punch.

To obtain the automatic compensation of the thermal effects already mentioned, the material of the shock absorber piston can be of aluminum alloy, zinc alloy or a plastic such as bakelite or the like, while the shock absorber tube is of steel.

In the examples described, the passage section is defined by the summit of a sharp angle 4c, 4'c along the profile of grooves 4, 4'. This solution gives the best result, but this sharp angle can be replaced by a flat part or the like provided that the axial length of this flat part or the like does not exceed 15 percent of the height of the piston, just as the added widths of the grooves do not exceed 15 to 20 percent of the circumference of the piston.

It should be noted that in the case of FIG. 3, a stop similar to that shown as 7 on FIG. 1 can be provided by placing a retaining washer below the support washer 8' to constitute a stop for clack 3' and an identical washer below nut 6. Support washer 8' will then be calibrated in thickness to define with precision the maximal deformation of clacks 3', 3'a.

In both cases, the retaining washer will advantageously comprise either perforations or radials or the like to prevent sticking of the clacks by suction on the retaining washer.

I claim:

1. A shock absorber comprising a cylinder containing a supply of oil, a piston rod and piston reciprocatable within the oil in said cylinder, a plurality of permanently open passageways around said piston comprising longitudinal grooves formed in the side wall of said piston, the sum of the widths of said grooves not exceeding 15 to 20 percent of the circumference of said piston, a portion of the length of each of said groove being shallower than the remainder of the groove in order to produce a thinning or lamination of the oil passing through, the length of the thus attenuated portion of the groove being at most equal to 15 percent of the total height of the piston.

2. The shock absorber according to claim 1 in which one end surface of the piston is peripherally beveled and the grooves terminate at points short of said surface, each groove having an end surface intersecting the beveled portion of the piston to provide said attenuated portion at said point.

3. The shock absorber according to claim 1 in which each groove has a bottom surface having a double bevel forming a summit directed toward the wall of the cylinder, the distance from said summit to the wall of the cylinder defining the width of said attenuated portion.

4. The shock absorber according to claim 1 in which each of the grooves is wider adjacent at least one end thereof than at intermediate points.

5. The shock absorber according to claim 1 in which there are provided controlled passageways through the piston, and there is provided an annular supporting ridge on one face of the piston, and an annular disk clack valve adapted to be seated against said supporting ridge and to flex in alternatively opposite directions to meter the flow of oil through the piston around its inward and outward circumferences, the outside diameter D of the clack valve and the diameter d of the circular ridge being such that $D - d/d$ is not less than 15 percent.

6. The shock absorber according to claim 5 in which there is provided a washer rigid with the piston and having a diameter slightly greater than the inside diameter of the clack valve, said clack valve having one of its faces adjacent its inner circumference resting upon said washer, the said face of the piston upon either side of said support ridge being relieved, the relief surface of the portion on the inside of said ridge serving as a stop means for limiting the stressing of the valve under pressure in one direction.

7. The shock absorber according to claim 6 in which the diamter of said inside relief portion is greater than the inside diameter of said valve.

8. The shock absorber according to claim 6 in which a retaining disk is provided on said piston rod in the direction away from said piston and beyond said washer and said clack valve, the outside edge of said retaining disk positioned to act as a stop means for the clack valve during the compression stroke.

9. The shock absorber according to claim 8 in which the position of the piston surface relief and the said retaining disk in relation to the clack valve is such that respective valve contact is made when the slope of the angle of deformation of the valve is equal to about 10 percent.

* * * * *